A. SILVERS.
Broom Head.
No. 51,663. Patented Dec. 19, 1865.
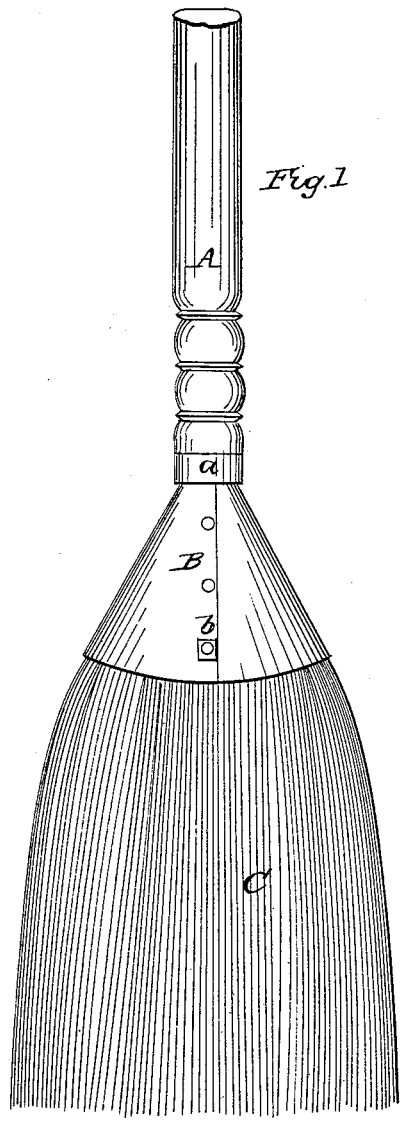
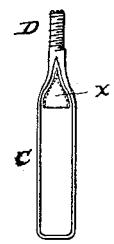
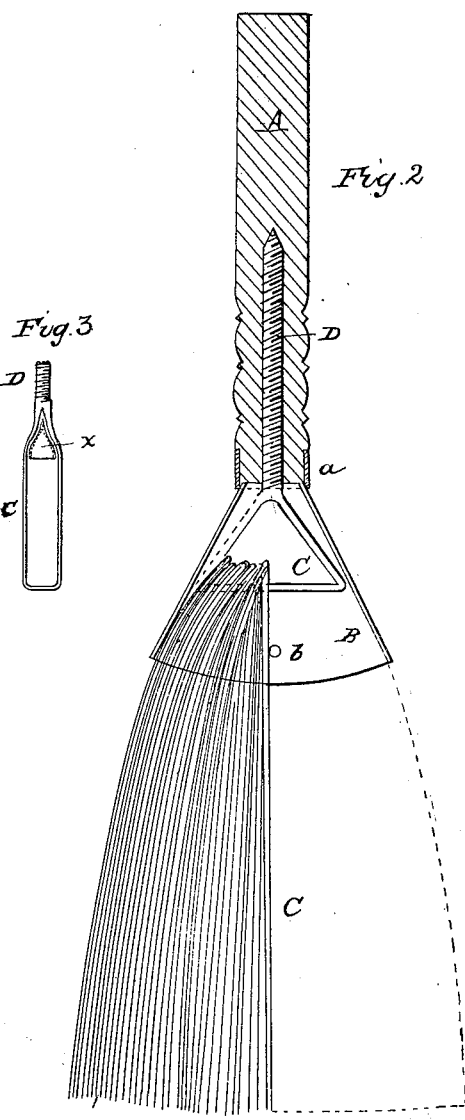
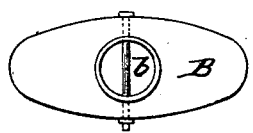
WITNESSES
John Leuhring
R. N. Carter
INVENTOR
Aaron Silvers

United States Patent Office.

AARON SILVERS, OF COLLINSVILLE, OHIO, ASSIGNOR TO HIMSELF, T. L. KENWORTHY, C. A. CLEGG, AND S. J. WALKER.

BROOM-HEAD.

Specification forming part of Letters Patent No. 51,663, dated December 19, 1865.

*To all whom it may concern:*

Be it known that I, AARON SILVERS, of Collinsville, in Butler county, and State of Ohio, have invented a new and useful Improvement in Broom-Heads, of which the following is a full and exact description, reference being had to the accompanying drawings, and to the letters of reference marked thereon.

My invention relates to certain improvements in the devices by which the broom-corn is secured to the handle, as will be hereinafter more fully described.

Figure 1 of the drawings denotes an exterior view of the complete broom. Fig. 2 represents a sectional view of the broom with the mechanism for securing the broom-corn, and Fig. 3 the screw-loop.

B denotes the sheath or cover, and *a* the ferrule on the end of the handle.

C D denote the screw-loop, as seen in Fig. 3 of the drawings.

*b* is a bolt extending through the sheath and corn, by which the broom may be fastened.

The screw-loop should be made narrow, as shown in Fig. 3, to receive the ends of the broom-corn, which ends are inserted alternately from the opposite sides of the loop C.

In order to construct the broom of the least weight, which I deem an important consideration, I construct the loop of very thin metal, and of sufficient width to retain the broom-corn which is inserted in it (and bent down) in line with the opening thereof; the object of this construction being to cause the two layers of broom-corn to extend out laterally and give the proper width to the broom, and also to cause the corn to be firmly retained in its position when the screw-bolt at the end of the loop is screwed up into the handle which draws the corn within the sheath or cover. It is evident that when the loop is made very wide or open, as shown in Fig. 2, there is liability of the corn becoming detached, as its ends are merely laid over the lower portion of a rod or bar constituting the loop; but in the use of my narrow loop, the sides of which are broad and thin, forming a kind of box, the ends of the broom-corn are retained in proper position, and when the loop is sufficiently filled, a V-shaped wedge of wood may be inserted at the top or apex of the loop, to retain the corn firmly.

In order to construct my broom of a suitable form, as a flattened cone or bell, which form I deem the best, I cut away a part of the stalks or ends of the broom-corn, to give the ends a tapering form. By this means I diminish the space required in the loop C, which the ends occupy, and at the same time give the proper form to the entire brush, that it will fit the sheath and fill it at the upper end thereof.

It is evident that brooms or brushes of various sizes may be made in accordance with my invention.

Various modes of constructing brooms with screws to attach the corn to the handle have been proposed, but I am not aware of any with a screw-loop into which the broom-corn is all inserted after being tapered down or shaved off with a knife, as hereinbefore described, and more particularly shown in Fig. 3 of my drawings.

It will be understood that the tapered ends of the broom-corn are alternately inserted on opposite sides of the box-formed loop C and bent down or doubled.

Any person capable of the simplest mechanical work may readily refill my broom-head with no other tools than a knife.

The wedge X may be inserted to hold the corn in the loop when the corn is dry and stubborn; but it should be dampened, and then, being thinned or tapered at the ends, it will occupy but little space.

Thus I am enabled to make a light and compact broom at a very small expense.

When the brush is worn out a new brush may be readily inserted in its place.

Having described my invention, I do not claim the use of a screw inserted in the handle of the broom, nor, severally, do I claim a sheath or ferrule, as these devices in various forms have been proposed heretofore; but What I do claim, and desire to secure by Letters Patent, is—

The screw-loop C D, as particularly described and represented in Fig. 3, when used, in combination with the other devices, for covering the broom and its mechanism, and the broom-corn is inserted and held in position in the manner and for the purpose substantially as described.

AARON SILVERS.

Attest:
WM. DOEGEN,
WILLIAM BRIGHTON.